United States Patent [19]

Muto

[11] Patent Number: 4,909,638
[45] Date of Patent: Mar. 20, 1990

[54] BUSH BEARINGS OF MALE AND FEMALE CLINCH TYPE HAVING AT LEAST TWO JOINTS

[75] Inventor: Takashi Muto, Nagoya, Japan

[73] Assignee: Daido Metal Company, Ltd., Nagoya, Japan

[21] Appl. No.: 326,427

[22] Filed: Mar. 21, 1989

Related U.S. Application Data

[63] Continuation of Ser. No. 151,830, Feb. 3, 1988, abandoned.

[30] Foreign Application Priority Data

Feb. 5, 1987 [JP] Japan .................................. 62-25412

[51] Int. Cl.$^4$ ........................ F16C 17/02; F16C 17/12
[52] U.S. Cl. ..................................... 384/273; 384/295
[58] Field of Search ............... 384/273, 272, 271, 295; 277/221

[56] References Cited

U.S. PATENT DOCUMENTS

| | | | |
|---|---|---|---|
| 1,271,077 | 7/1918 | Probasco | 277/221 |
| 1,859,045 | 5/1932 | Monckmeier | 384/273 |
| 2,464,653 | 3/1949 | Phipps | 277/221 |
| 4,102,419 | 7/1978 | Klima | 277/221 |

FOREIGN PATENT DOCUMENTS

| | | |
|---|---|---|
| 39-24101 | 8/1964 | Japan . |
| 44-7446 | 3/1969 | Japan . |
| 44-20681 | 9/1969 | Japan . |

Primary Examiner—Lenard A. Footland
Attorney, Agent, or Firm—Browdy and Neimark

[57] ABSTRACT

A bush bearing of male and female clinch type which has at least two joints.

4 Claims, 4 Drawing Sheets

BUSH BEARINGS OF MALE AND FEMALE CLINCH TYPE HAVING AT LEAST TWO JOINTS

This application is a continuation of application Ser. No. 07/151,830, filed Feb. 3, 1988 now abandoned.

BACKGROUND OF THE INVENTION

1. Field of the Invention

The present invention relates to a bush bearing of male and female clinch type having at least two joints.

2. The Prior Art

A joint configuration in a conventional wrapped bush bearing been of two types including a butt joint type and a clinch type, which are used properly in compliance with the purposes of use. In general, the butt joint type is widely utilized from the economic point of view, while the clinch type is employed when needed from the functional point of view.

It is usual that the wrapped bush bearing having either one of the above-mentioned two types of joint configuration has a single joint. The wrapped bush bearing having a single joint has the following disadvantages.

(a) If the bush bearing is manufactured only by press forming, accuracy in out of roundness of the bush bearing is low as compared with a split type bearing.

(b) If the bush bearing is of tapered type, the yield of material is low. Specifically, a bearing stock having a width of the finished bearing is first bent into a cylindrical body, and then the opposite axial end faces of the cylindrical body are machined into a requisite tapered bush configuration. Thus, the tapered bush bearing is low in yield of material.

(c) The yield of material is also low when a longitudinal direction of a bearing strip is aligned with the direction in which the bush bearing is wrapped. The reason for this is that, when blanking is performed in the strip, it is necessary to take into account an allowance margin or a cutting margin in the vicinity of each of mating portions of the bush bearing, because the mating portions are different in configuration from each other.

SUMMARY OF THE INVENTION

It is an object of the invention to provide a bush bearing which is high in accuracy of out of roundness, and high in yield of material.

According to the invention, there is provided a bush bearing of male and female clinch type which has at least two joints.

DETAILED DESCRIPTION

Figure 1:
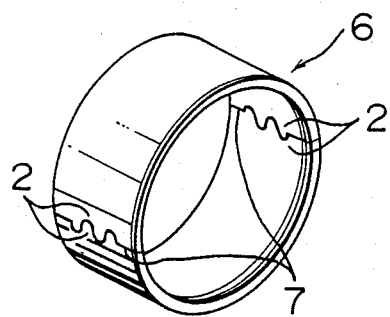
FIG. 1 is a perspective view of a wrapped bush bearing according to a first embodiment of the invention.
Figure 2:
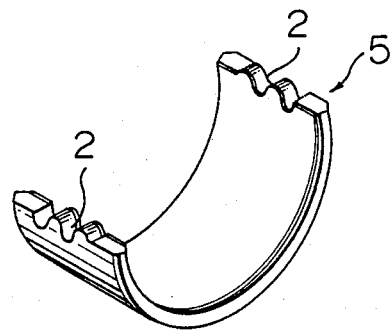
FIG. 2 is a perspective view of one of two bearing halves forming the wrapped bush bearing illustrated in FIG. 1.
Figure 3:
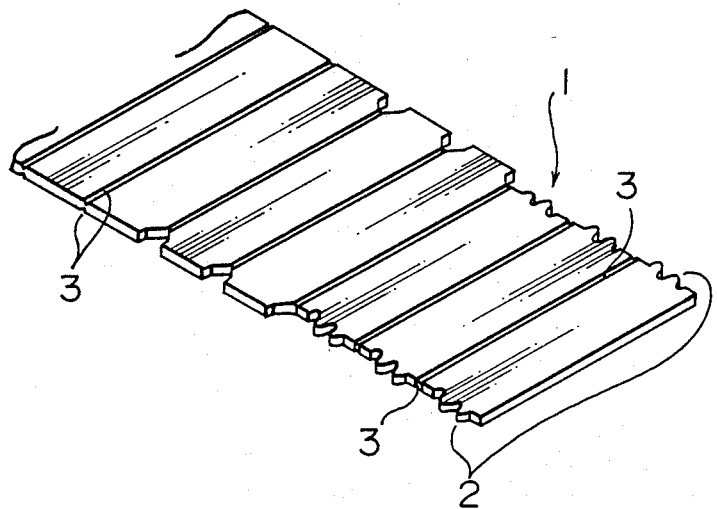
FIG. 3 is a perspective view showing blanking of the wrapped bush bearing illustrated in FIG. 1.
Figure 4:
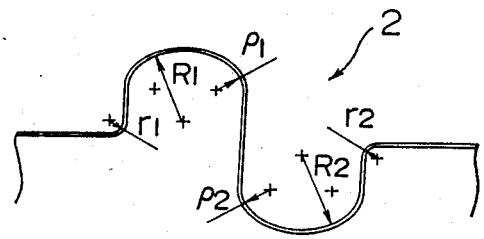
FIG. 4 is an enlarged fragmental view showing a contour of mating portions of the bush bearing illustrated in FIG. 1.

Referring to FIGS. 1 through 4, there is illustrated a wrapped bush bearing 6 according to a first embodiment of the invention. In FIG. 3, mating portions 2 are formed, by means of press forming, on opposite lateral side edges of a bearing strip 1. Each of the mating portions 2 has projections and recesses which are complementary respectively to each other. In addition, the bearing strip 1 is formed in its both sides with laterally extending grooves 3 each having a V-shaped cross-section. The bearing strip 1 is severed along the grooves 3 into pieces. The severed piece is then bent into a semicircular shape to form a bearing half 5 as shown in FIG. 2. Two such bearing halves 5 are joined to each other to form a bush bearing 6 as shown in FIG. 1. It is to be noted that the thus formed bush bearing 6 has two joints 7 of clinch type such that the bearing halves cannot be displaced axially relative to each other in a free state. FIG. 4 illustrates, in an enlarged scale, an example of the contour of the mating portions 2.

From FIG. 4 it is seen that the projections or joining elements have semi-circular curves of major radius $R_1$ and $R_2$ from their respective centerpoints. Along outside edges which transition to a transverse joining line are reverse curves of minor radius $r_1$ and $r_2$, and along inside edges which transition to an inclined longitudinal joining line are curves of minor radius $p_1$ and $p_2$. As can also be seen, the sum of the radii $R_1$ and $R_2$ is greater than the distance between their centerpoints whereby interfitting of the projections causes them to lock together or clinch.

Figure 5:
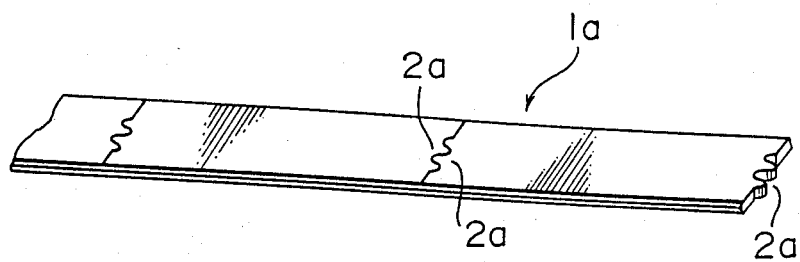
FIG. 5 is a perspective view showing blanking of a wrapped bush bearing according to a second embodiment of the invention.

Another example of blanking is shown in FIG. 5, in which mating portions 2a are formed such that a longitudinal direction of a bearing strip 1a is aligned with a direction in which a bush bearing is wrapped. The blanking shown in FIG. 5 is higher in yield of material than that shown in FIG. 3.

Figure 6:
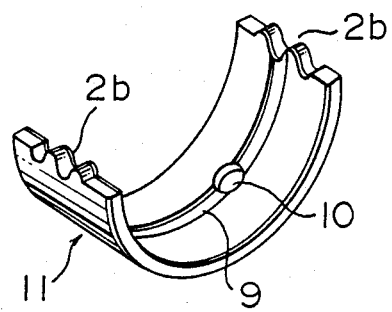
FIG. 6 is a perspective view of one of two bearing halves forming the wrapped bush bearing according to the second embodiment.
Figure 7:
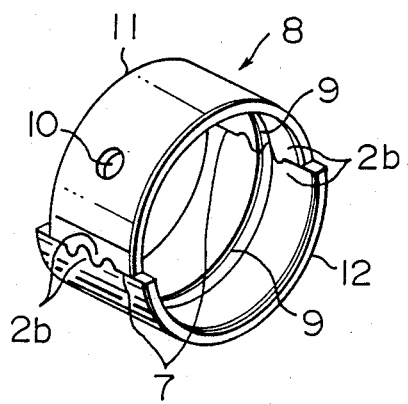
FIG. 7 is a perspective view of the wrapped bush bearing according to the second embodiment.

Referring to FIGS. 6 and 7, there is illustrated a bush bearing 8 according to a second embodiment of the invention, in which the bush bearing 8 is provided therein with an oil groove 9 and an oil bore 10, and has two bearing halves 11 and 12 different in axial width from each other.

Figure 8:
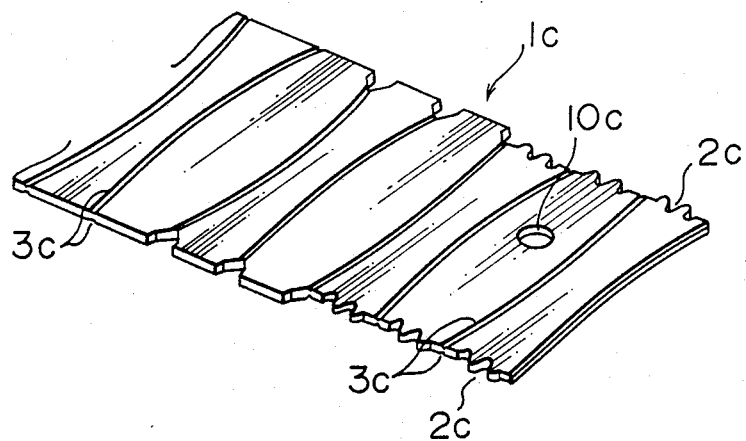
FIG. 8 is a perspective view showing blanking of a tapered bush bearing according to a third embodiment of the invention.
Figure 9:
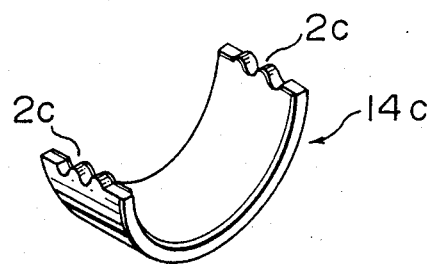
FIGS. 9 and 10 are perspective views respectively showing two bearing halves forming the tapered bush bearing according to the third embodiment.
Figure 10:
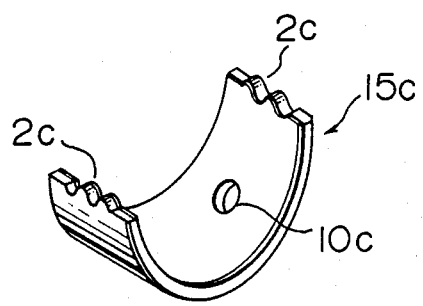
Figure 11:
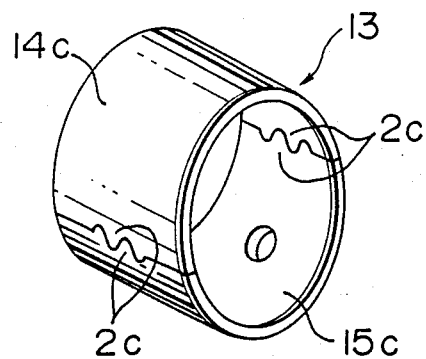
FIG. 11 is a perspective view of the tapered bush bearing formed by the bearing halves illustrated respectively in FIGS. 9 and 10.
Figure 12:
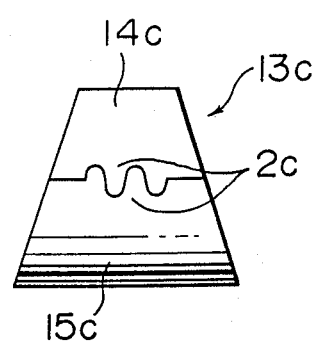
FIG. 12 is a side elevational view of the tapered bush bearing illustrated in FIG. 11.

Referring to FIGS. 8 through 12, there is illustrated a tapered bush bearing 13 according to a third embodiment of the invention. As shown in FIG. 8, grooves 3c and mating portions 2c are formed in a bearing strip 1c by means of press forming. Each of the grooves 3c has a V-shaped cross-section and extends, laterally of the strip 1c, generally in an arcuate form as viewed in plan. The bearing strip 1c is severed along the V-shaped grooves 3 into pieces. The severed pieces are then bent widthwise of the strip 1c to form respective bearing halves 14c and 15c shown respectively in FIGS. 9 and 10. Subsequently, the bearing halves 14c and 15c are assembled with each other to form a tapered bush bearing 13 as shown in FIG. 11. The tapered bush bearing 13 has its opposite axial end faces which are inclined with respect to an axis of the tapered bush bearing 13. Thus, the tapered bush bearing 13 is trapezoidal in shape as viewed in side elevation as shown in FIG. 12.

Figure 13:
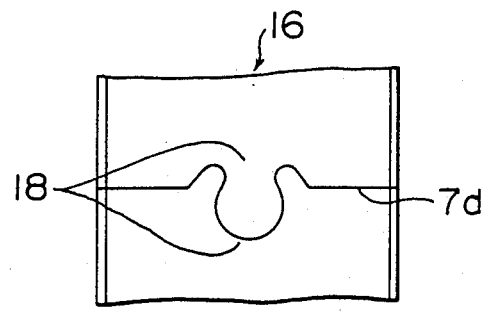
FIG. 13 is a fragmental view of mating portions of a bush bearing, the mating portions being of single clinch type.
Figure 14:
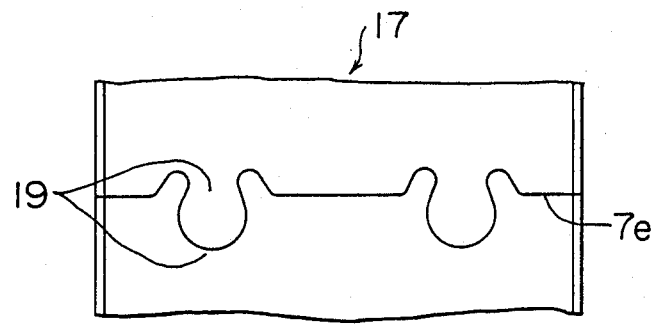
FIG. 14 is a fragmental view of mating portions of a bush bearing, the mating portions being of composite clinch type.

FIG. 13 shows a bush bearing 16 having two joints 7d (only one shown) each of which has a single clinch configuration 18. FIG. 14 shows a bush bearing 17 having two joints 7e (only one shown) each of which has a composite clinch configuration 19.

As described above, the bush bearing of male and female clinch type having at least two joints according to the invention has the following advantages.

(a) Since bearing halves are assembled with each other to form a bush bearing, out of roundness as attained is favorable, making it possible to omit the step of machining the outer diameter of the bush bearing.

(b) Desirable bearing outer diameter and axial width are obtained by means of press forming, and an oil groove and an oil bore can also be formed in the bush bearing by means of press forming.

(c) Bearing halves different in axial width from each other can be assembled with each other to form a substitute for a tapered bush bearing. This makes it possible to simplify the manufacturing steps, and to improve the yield of material.

(d) Two bearing halves which are different in thickness of an alloy layer and/or different in alloy material from each other can be used to meet various bearing design requirements. For example, one of the two bearing halves may have a single layer of alloy or iron.

(e) Bush bearing formed by two bearing halves is superior in thickness distribution as compared with wrapped bush bearings.

Accordingly, an alloy layer or layers in a bush bearing can be set to be small in thickness.

(f) The yield of material is improved.

(g) The basic or fundamental manufacturing steps of a bush bearing formed by two bearing halves can be made common to those of a cylindrical bush bearing. This makes it possible to utilize the equipment effectively.

(h) Depending upon the purposes of use of the bush bearing, two or more bearing pieces may be assembled with each other to form a bush bearing.

What is claimed is:

1. A cylindrical slide bearing to be press fitted into a bore formed in a bearing housing, comprising in combination an upper slide bearing half and a lower slide bearing half, said two bearing halves having first and second ends, each end of one of the bearing halves being adapted to interlock with a corresponding end of the other of the bearing halves, each of said first and second ends having at least one pair of joining elements consisting of a recess and a projection of the same size and configuration, said joining elements of said first end being of the same configuration and of the same size as those of said second end but being formed at positions shifted axially so that said joining elements of said first and second ends are arranged in such a manner that, when said ends of said bearing halves are joined together, a pair of said joining elements formed in one of said ends is complementary and interfits with the pair of said joining elements formed in the other corresponding one of said ends, each joining element having a radius of curvature R extending from a centerpoint whereby 2R is greater then the distance between adjacent centerpoints so that said joining elements interlock with one another.

2. A bush bearing as defined in claim 1 wherein the bush bearing has its opposite axial end faces which are inclined with respect to an axis of the bush bearing.

3. A bush bearing as defined in claim 1, wherein said two bearing halves are the same in axial width.

4. A bush bearing as defined in claim 1, wherein said two bearing halves are different in axial width.

* * * * *